F. DORMANN.
FRICTIONAL GEARING.
APPLICATION FILED JULY 31, 1916.
1,262,467.
Patented Apr. 9, 1918.
4 SHEETS—SHEET 1.
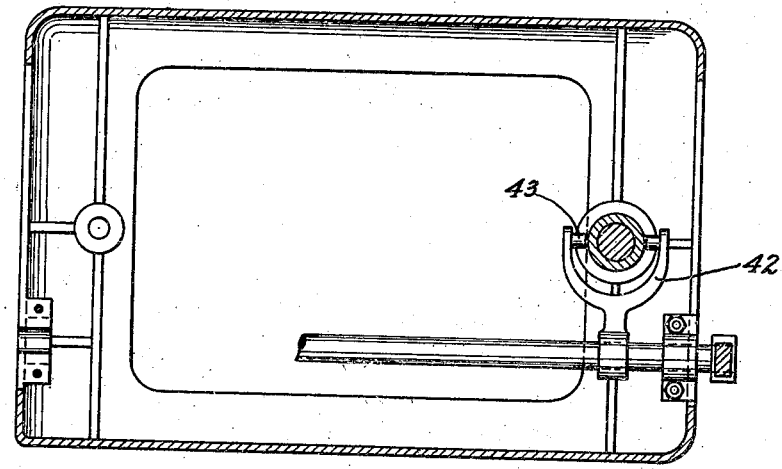
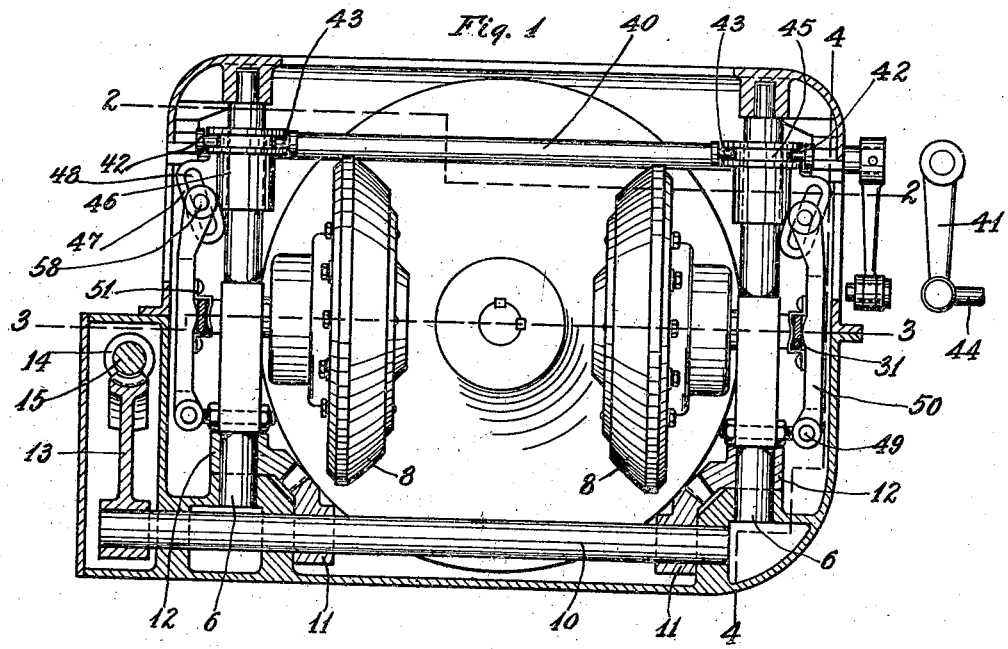
Fred Dormann, Inventor F. DORMANN.
FRICTIONAL GEARING.
APPLICATION FILED JULY 31, 1916.
1,262,467.
Patented Apr. 9, 1918.
4 SHEETS—SHEET 2.
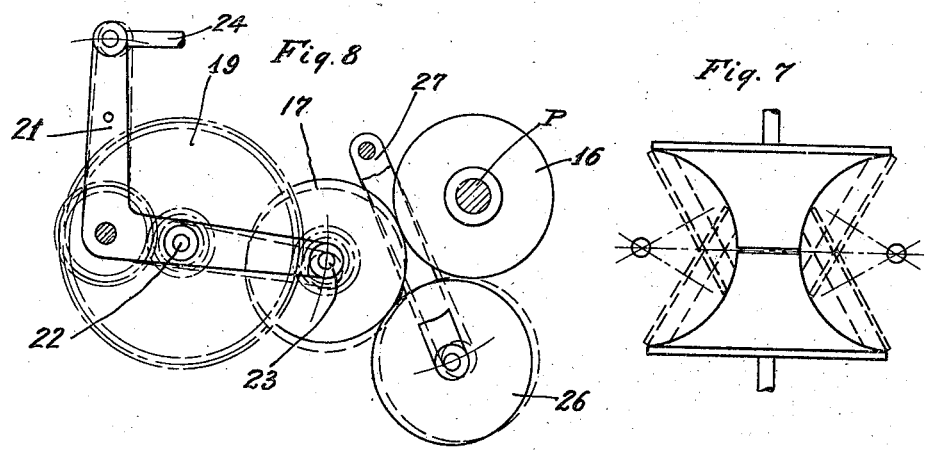
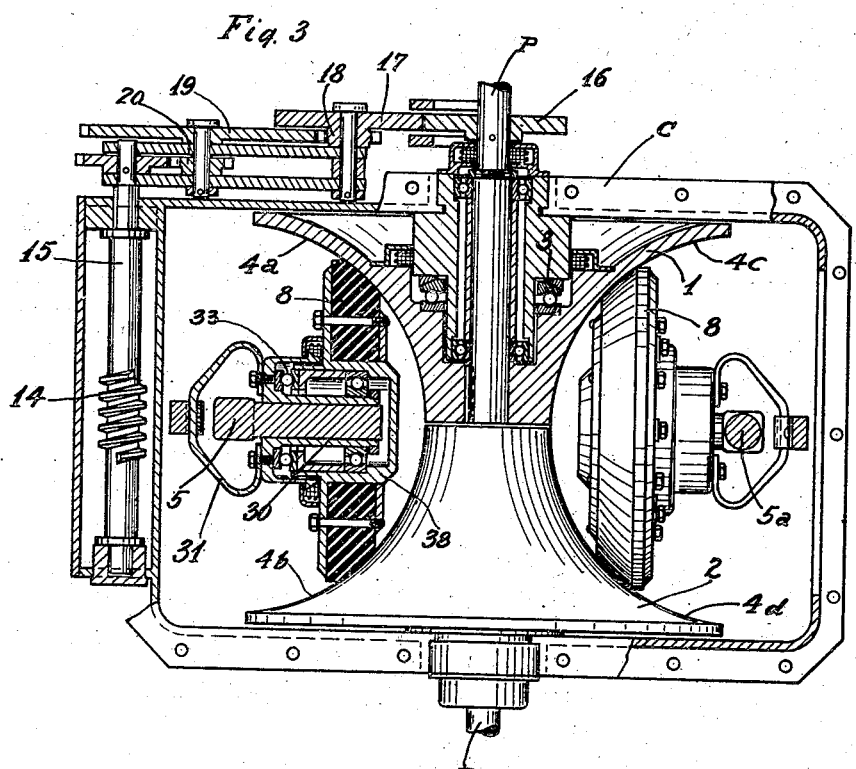

F. DORMANN.
FRICTIONAL GEARING.
APPLICATION FILED JULY 31, 1916.
1,262,467.
Patented Apr. 9, 1918.
4 SHEETS—SHEET 3.
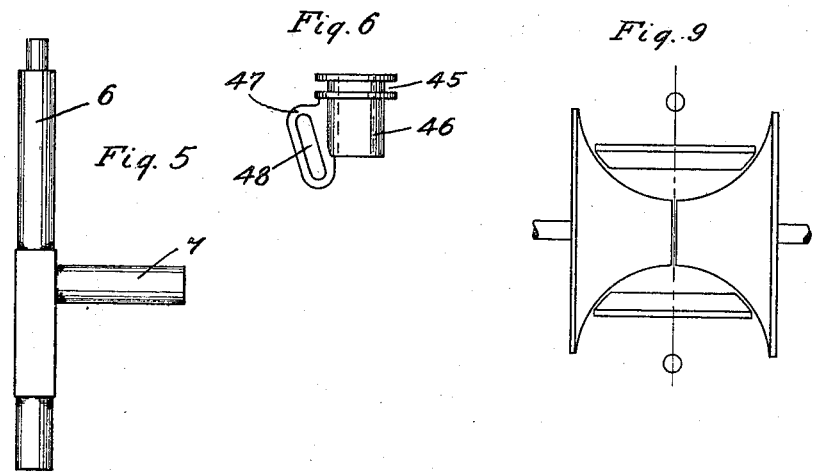
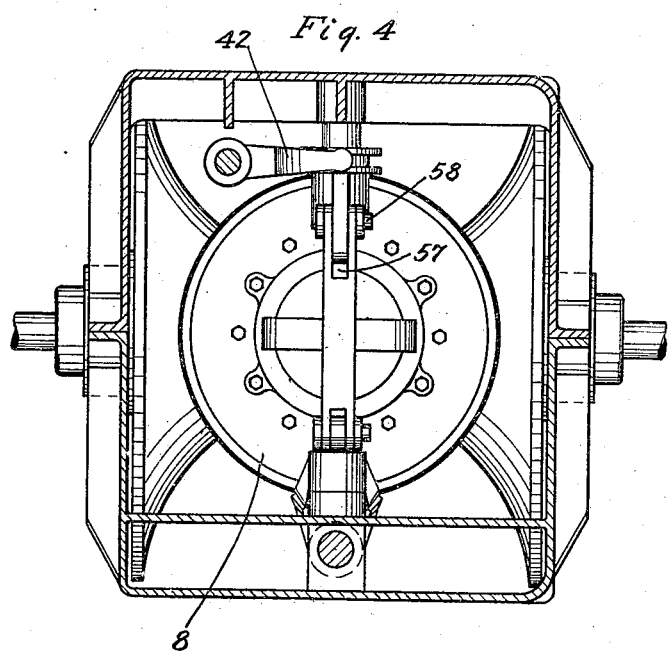

F. DORMANN.
FRICTIONAL GEARING.
APPLICATION FILED JULY 31, 1916.

1,262,467.

Patented Apr. 9, 1918.
4 SHEETS—SHEET 4.

Fred Dormann, Inventor

Witnesses

UNITED STATES PATENT OFFICE.

FRED DORMANN, OF LONGMONT, COLORADO.

FRICTIONAL GEARING.

1,262,467.   Specification of Letters Patent.   Patented Apr. 9, 1918.

Application filed July 31, 1916. Serial No. 112,421.

*To all whom it may concern:*

Be it known that I, FRED DORMANN, citizen of the United States, residing at Longmont, in the county of Boulder and State of Colorado, have invented certain new and useful Improvements in Frictional Gearing; and I do hereby declare the following to be a full, clear, and exact description of the invention, such as will enable others skilled in the art to which it appertains to make and use the same.

This invention relates to machine elements, and more especially to frictional gearing; and the general object of the invention is the production of a compact device consisting of a combined clutch and speed change mechanism of the frictional type and embodying improvements designed to reduce to a minimum the slippage and the effects thereof and with a manual control for said clutch and for said speed change mechanism.

In the following specification I have set forth perhaps the simplest manner of carrying out the idea, reference being had to the accompanying drawings in all of whose main views the casing is shown in section, and wherein:

Figure 1 is a rear end elevation with one of the drums removed, Fig. 2 is a sectional detail on the line 2—2 of Fig. 1, Fig. 3 is a view in partial section on about line 3—3 of Fig. 1 showing both drums in place, and Fig. 4 is a right side elevation, being in effect a section on the line 4—4 of Fig. 1.

Figs. 5 and 6 are details of parts, and Figs. 7, 8 and 9 are diagrams to be referred to hereinafter.

Figure 10:
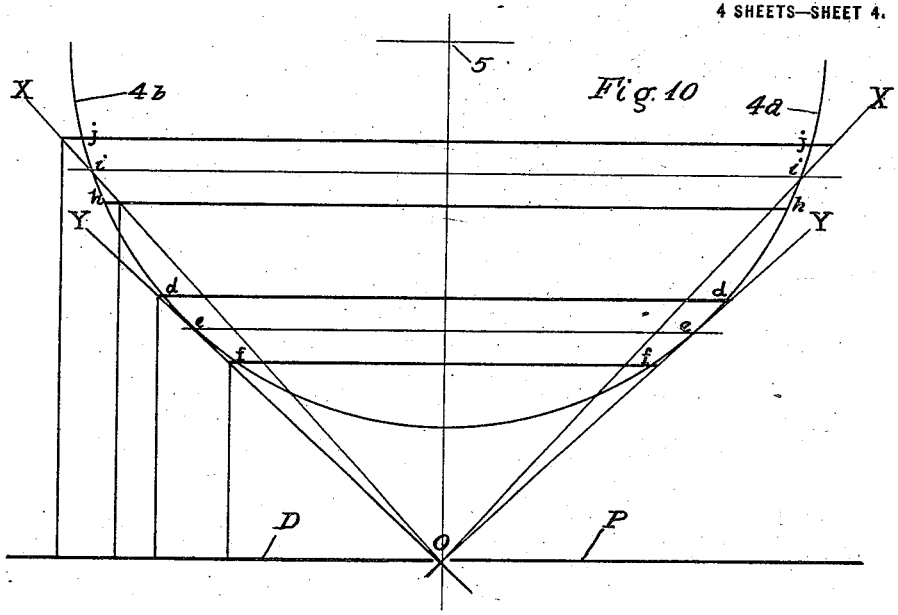
Figs. 10 and 11 are diagrams illustrating the method of determining the location of the disks 8.

This invention is applicable to many kinds of machinery but the form here shown has been designed with especial reference to use in automobiles and, for convenience, the invention will be here described as applied to and used in an automobile.

In the drawings I have used the letter P to designate the power shaft which usually leads to the rear from an automobile engine, and the letter D to designate the driven shaft which usually stands in rear of the power shaft and forms a continuation of the power line. The contiguous ends of these two shafts extend into a casing C whose details need not be further amplified. The following specification describes the parts on this basis, but obviously it is immaterial in which direction the power is to be transmitted through this mechanism, and while these shafts are shown horizontal in Fig. 3 they do not necessarily occupy that position, though within the casing these shafts must be in alinement.

Secured to the power shaft is a driving element 1 herein called a drum, and secured to the driven shaft is a similar drum 2; and the shafts are mounted in suitable thrust bearings in the casing, as shown in detail at 3 for the purpose of holding the drums in their true relative position at all times as best seen in Fig. 3 and as hereinafter more fully described.

The working face of each drum is entirely smooth and is a portion of the inner surface of a circular ring, generated by the revolution of a circle about the axis of shafts P and D. When the drums stand end to end, as seen in Fig. 3, a horizontal section cut through their axis would disclose their outline in four arcs $4^a$ and $4^b$, $4^c$ and $4^d$, of which pairs of arcs points 5 and $5^a$ are the respective centers, said points being in the center line of said circular ring.

On these centers stand upright shafts 6 (see detail in Fig. 5) mounted at their upper and lower ends in suitable bearings in the casing and each having an inwardly projecting stub shaft 7 on which is rotatably mounted a disk 8 seen in Fig. 3.

The rotation of said circle about the generating radius of said circular ring as an axis, generates a sphere and the disks 8 are best described as being slices, or spherical zones, cut from said sphere at some distance from the center thereof. The exact distance from the center of the sphere at which the slice (disk 8) shall be taken is important and the manner of determining this distance and the thickness of the slice and the reason therefor will be more fully described later.

Throughout the drawings and specification I have illustrated and described two disks, but it is obvious I could use a greater number, although I prefer never to use less than two. When the disks stand parallel with each other and with the axis of the drums as seen in Fig. 3 the motion is transmitted from the power drum to the driven drum without change of speed. This is called direct drive position. When the disks are turned or swung outward on the power drum and inward on the driven drum, as diagramed at Fig. 7, the latter is rotated at an increased speed. On the other hand, when the disks are swung in the opposite direction as diagrammed at Fig. 7, the driven drum is rotated at a reduced speed. The extremes of these positions are called, respectively, high gear and low gear. But whatever the position of the disks, except when retracted as hereinafter described, the working surface of each throughout its width, stands constantly in contact with the working surfaces of both drums.

In setting the disks, they must obviously be moved oppositely and simultaneously with accuracy, and my preferred manner of bringing this about is as follows: A shaft 10, journaled preferably along the bottom of the casing, carries gears or toothed sectors 11 meshing with others numbered 12 fast on the shafts 6 near their lower ends, and the shaft 10 may be turned by hand or otherwise. I prefer to mount on one end of it a toothed sector 13 engaged by a worm 14 on a shaft 15, and the pitch of the worm is quite fine so that this shaft must be turned considerably to oscillate the shaft 10 to even a small degree, and the engagement between the sector or worm gear 13 and the worm 14 will hold the parts after they are set. I prefer to employ mechanism actuated by the power shaft P for turning the worm shaft 15, and this mechanism is shown in section in Fig. 3 and in diagram in Fig. 8. Fast on said shaft P is a driving friction wheel 16 whose periphery contacts with a driven friction wheel 17, and the hub of the latter carries a gear 18 which is in constant mesh with another gear 19, and so on through a train of gears 20 to the worm shaft 15. An idle friction wheel 26 is journaled in a swinging support 27 and stands in about the relative position to the wheels 16 and 17 shown in Fig. 8. The driven wheel 17 is movable slightly under the influence of a manual control, and the latter is shown herein as consisting of a bell-crank lever 21 which has one arm pivotally mounted at 22 on the axis of the large gear 19 and extending beyond the latter and pivotally supporting the driven wheel 17 at the point 23, while the other arm of the lever is connected by means of a rod 24 or otherwise with a hand lever which stands within reach of the driver. When now this rod is drawn upon, the point 23 is depressed and the driven wheel 17 forced down upon the idler 26, thus forcing the idler to move on its swinging support 27 and throwing its periphery into contact with the driver 16. On the other hand, when the rod 24 is moved in the opposite direction the point 23 rises and the periphery of the driven wheel 17 is forced against the periphery of the driver 16, while the idler swings down out of contact with the latter and may rest against and be rotated idly by the driven wheel 17. There is manifestly a position between the two extremes where the driven wheel is not rotated in either direction. Therefore it is possible for the operator through this control to throw the rotating power shaft P into communication with the worm shaft 15 and to hold it there as long as desired, with the result that one or more threads of the worm 14 are caused to travel through the teeth of the sector 13, the shaft 10 is oscillated a trifle, and both disks are swung or set simultaneously and oppositely.

For holding each disk to its work, whatever the position of parts, I employ means including the special bearing of Fig. 3 as referred to above. Slidably mounted on the stub shaft 7 is a sleeve 30, and the hub 38 of the disk 8 surrounds said sleeve and may be mounted thereon by means of suitable bearings, including a thrust bearing 33. Attached to the sleeve is a looped spring 31 which loosely incloses the shaft 6 and is connected to the outside of the same, preferably by means which permit an adjustment of the position of this spring and disk as the working faces of the members become worn. Yet the fact that the element 31 is a spring does permit a slight outward movement of the disk on the sleeve 30 under excess of strain, and therefore avoids breaking of parts which might otherwise occur. The spring turns with the shaft 6 as the latter is adjusted in its bearings to set the disk in various positions.

For retracting the disks to draw them out of contact with the drums and thus terminate the connection between the driving and driven elements, I provide special means for moving the sleeves 30 simultaneously and oppositely on the stub shafts 7. Journaled across the interior of the casing near its top is a rock shaft 40 having on one extremity a lever 41 from which a rod 44 leads to a manual control within reach of the driver, and this shaft carries two forks 42 whose arms have pins 43 engaging grooves 45 in collars 46 slidably mounted on the upper portions of the respective shafts 6. Each of said collars (see Fig. 6) has a wing 47 provided with an oblique slot 48. Pivotally connected at 49 with the shaft 6 is a lever 50 which stands outside said shaft and has a loop 51 embracing and holding said looped spring 31, and the upper end of this lever is forked as seen at 57 and provided through its arms with a bolt or pin 58 which loosely engages said slot 48. By this construction, movement of the manual control oscillates shaft 40 and raises or lowers the collars 46 in unison, and the rise of each collar causes its oblique slot 48 to swing the upper end of one lever 50 outward. This movement of the lever carries with it the spring 31, and therefore the sleeve 30 is slid outward slightly along the stub shaft 7, with the result that the disk is drawn out of contact with both drums as shown diagrammatically in Fig. 9. I have illustrated and described this mechanism for retracting the disks as employed when there are two disks only, but it will be obvious without further illustration that if there were, for instance four disks around the drums, another rock shaft oscillated by the movements of that shown could be supplied and which with the details just described would cause the simultaneous movement of the other two disks as is necessary to withdraw them all from contact with the drums. Thus the retraction of the disks has the effect of terminating the connection between the power and driven shafts, so that this construction acts in the nature of a clutch mechanism and eliminates the necessity for that element as an additional unit. Attention is directed to the fact that although the retraction of the disks is shown in Fig. 9 as occurring when they stand parallel to the axis of the drums, it could just as well occur at a time when they stood oblique. Therefore the clutch mechanism can be opened or closed at low speed or high speed, or on direct drive. It will not be necessary for the purposes of this specification to show the means for moving the rods 24 and 44 to effect the different controls.

I shall now describe the manner of determining the thickness of the disk (slice) 8 and locating it with reference to the center of the sphere of which it is a slice.

In order to fulfil the requirements of true rolling contact it is essential that the surfaces of contact shall be parts of cones whose apexes are at the intersection of their axes. It is therefor evident that if the line of contact is curved there cannot be a true rolling contact throughout its length, and the departure from a true rolling contact will be in accordance with the deviation of the curved line from the boundary line of the cone. For example, in Fig. 10, in which letters P and D and reference numerals $4^a$, $4^b$ and 5 indicate the power and driven shafts and the drum surface lines and center of the sphere, as hereinabove described, respectively, assume a disk corresponding to a slice of the sphere bounded by planes $j$—$j$ and $h$—$h$.

If this slice were considered as a slice of a cone having its apex at O (the point of intersection of line 5—O—the axis of the disk—with the axis of the power line P—D) and having its boundary lines O—X intersecting lines $4^a$ and $4^b$ midway between planes $j$—$j$ and $h$—$h$, as at $i$, it will be evident that such a slice will have a pure rolling contact throughout the line of contact with a corresponding slice of a cone apexing at O and having line D—P as its axis, such line of contact being that portion of line O—X which is included between the planes $j$—$j$ and $h$—$h$. When, however, the line of contact is a curved line, as line $4^a$ and $4^b$ in the present case, it is evident that at only one point in the line of contact will there be a true rolling contact, namely at point $i$ where the line of the supposed cone O—X intersects the curved contact line $4^a$—$4^b$; and it will be observed that the condition of contact deviates from that of true rolling contact to an extent shown graphically by the divergence of the lines O—X and $4^a$—$4^b$ in each direction from their point of intersection $i$. This deviation or divergence is the measure of the slippage. In this case the total slippage along the line of contact is the sum of the slippage on both sides of the point of true rolling contact, to-wit: point $i$.

From the illustration of the foregoing example in Fig. 10 it clearly appears that the divergence of the curved and straight contact lines is considerable and therefore, that there would be a considerable slippage were the slice selected at the place assumed.

On the other hand, I have found that the slice or disk can be located with any degree of certainty as to its efficiency, only by first finding what I term the tangent circle and using it as a basis. Take as a starting point the point of intersection of the axis of the disk (as 5—O) with the axis of the power line (P—D), said point being at O in Fig. 10, and draw therefrom lines (as O—Y) tangent to the lines $4^a$ and $4^b$. The circle passing around the sphere and through these points of tangency I term the tangent circle.

Take a disk (slice) of the same thickness as slice $j$—$j$—$h$—$h$ but which is so located as to include midway between its faces the tangent circle, for example slice $d$—$d$ $f$—$f$ including the tangent circle $e$—$e$. If this slice were considered as a slice of a cone having its apex at O and having as its boundaries the said lines O—Y it will be evident that it will have a pure rolling contact throughout the line of contact with a corresponding slice of a cone apexing at O and having line D—P as its axis, such line of contact being that position of line O—Y which is included between the planes $f$—$f$ and $d$—$d$. As mentioned above, when the line of contact is changed to a curve there will be but one point where there is true rolling contact, which in this case will be at the tangent circle $e$—$e$, and it will be observed that the condition of contact deviates from that of true rolling contact to an extent shown graphically by the divergence of the lines O—Y and $4^a$—$4^b$ in each direction from the point of tangency.

From a comparison of the illustrations in Fig. 10 of the two foregoing examples it will clearly appear that the divergence of the curved from the straight contact lines, and therefore the slippage, is reduced to the minimum in the case of the slice having the tangent circle at its center.

I have found accordingly, that were a disk to be used at all times in the same speed position the most efficient one would be that so located with relation to the center of the sphere and the power line that the tangent circle would be substantially midway between the faces of the disk.

Figure 11:
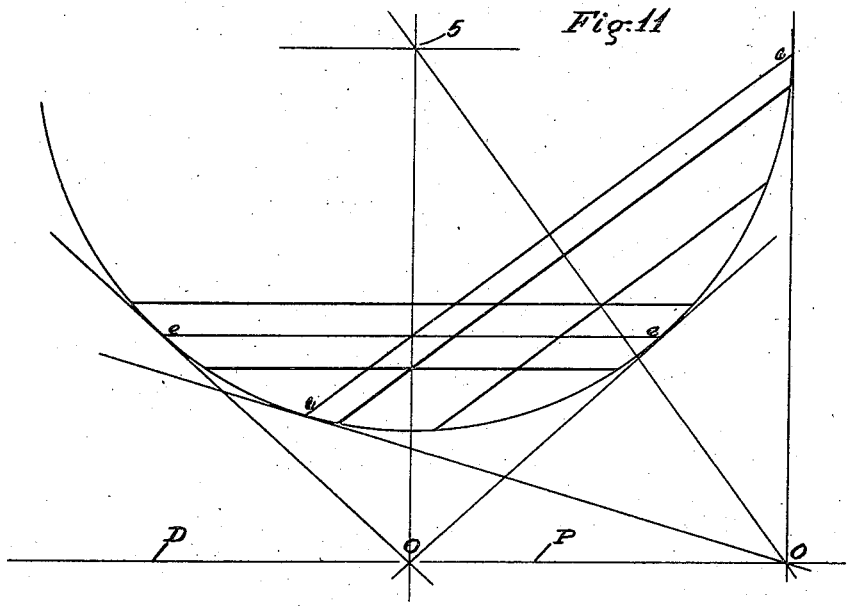

In actual practice, however, the disk does not remain in the same speed position but has to perform its work in all positions both at and between the high gear and low gear positions. It is apparent that the disk must remain, in all speed positions, at the same distance from the center of the sphere but it is also apparent, as clearly illustrated at Fig. 11 (e indicating the tangent circle), that as the disk is tilted from one speed position to another the point O moves along the power line and likewise that the distance of point O from the disk varies. Clearly this results in changing the relative positions of the disk faces and the tangent circle so that a disk having the tangent circle substantially midway between its faces when in direct drive position may, when moved to high or low gear, leave the tangent circle close to or even outside of one of its faces.

By experiment I have found that for the best average results, considering the tilting of the disk and the attendant changes in relative position of the tangent circle, that disk is the most efficient which is so located that in direct drive position the face of the disk nearer the center of the sphere will be between said center and the tangent circle while in high and low gear positions the tangent circle will be between said center and the other face of the disk.

What I claim is:

1. In a frictional gearing, the combination with two cone-shaped drums mounted on alined axes with their smaller ends adjacent and their working faces concaved; of a plurality of retractive disks whereof each contacts with both said drums, a bearing on which each disk is journaled, a shaft supporting each bearing, and means for oscillating the several shafts simultaneously and to equal extent, for the purpose set forth.

2. In a frictional gearing, the combination with two truncated cone-shaped drums mounted on alined axes with their smaller ends adjacent and their working faces concaved on arcs of an imaginary circle; of a plurality of retractive disks whereof each contacts with both said drums, a bearing for each disk, a shaft for each bearing standing at the center of said imaginary circle, and means for oscillating the several shafts simultaneously and swinging said bearings to equal extent, for the purpose set forth.

3. In a frictional gearing, the combination with two truncated cone-shaped drums mounted on alined axes with their smaller ends adjacent and their working faces concaved on arcs of an imaginary circle; of a pair of retractive disks whereof each contacts with both said drums, a journal for each disk, a rock shaft for each journal standing at the center of said imaginary circle, a cross shaft, gearing connecting it with both said rock shafts, a control, and connections between said control and cross shaft, for the purpose set forth.

4. In a frictional gearing, the combination with two truncated cones mounted on alined axes with their smaller ends contiguous and their working faces concaved on arcs of an imaginary circle; of a pair of disks whereof each contacts with both said faces, a journal for each disk, a rock shaft for each journal standing at the center of said imaginary circle, a cross shaft, gearing connecting it with both said rock shafts, a worm gear on said cross shaft, a shaft having a worm engaging this gear, connections between the shaft of one of said cones and the worm shaft, and manually controlled means within said connections for causing the rotation of the worm shaft in either direction and to the extent desired.

5. In a frictional gearing, the combination with two truncated cones mounted on alined axes with their smaller ends contiguous and their working faces concaved on arcs of an imaginary circle; of a pair of disks whereof each contacts with both said faces, a journal for each disk, a rock shaft for each journal standing at the center of said imaginary circle, a cross shaft connected with both rock shafts, a longitudinal shaft connected with the cross shaft, a driving wheel on the shaft of one of said cones, a driven wheel contiguous thereto and connected with said longitudinal shaft, an idle wheel adjacent the driving and driven wheels, and manually controlled means for imparting motion from the driving wheel direct to the driven wheel in one direction or through the idler to turn the driven wheel in the opposite direction.

6. In a frictional gearing, the combination with two cones mounted on alined shafts and having concaved working faces, a disk contacting with both faces, an upright shaft having a bearing on which the disk is journaled, and a longitudinal shaft connected with said upright shaft for oscillating it to swing the bearing and disk; of a driving wheel on the shaft of one of said cones, a driven wheel connected with said longitudinal shaft, and manually controlled means for transmitting power from the driving wheel to the driven wheel in either direction and to the extent desired, for the purpose set forth.

7. In a frictional gearing, the combination with two cones mounted on alined shafts and having concaved working faces, a disk contacting with both faces, an upright shaft having a bearing on which the disk is journaled, and a longitudinal shaft connected with said upright shaft for oscillating it to swing the bearing and disk; of mechanism leading from the shaft to one of said cones through a train of gearing to said longitudinal shaft, and manually controlled means within said mechanism for causing the power transmitted thereby to turn the shaft in either direction and to the extent desired, for the purpose set forth.

8. In a frictional gearing, the combination with two truncated cones mounted on alined shafts with their working faces concaved on arcs of an imaginary circle, an upright rock shaft standing at the center of said circle, and a stub shaft projecting from it toward the cones; of a sleeve slidably mounted on said stub shaft, a spring connecting the sleeve with said rock shaft, and a disk standing on the chord of said circle and having its hub journaled around said sleeve.

9. In a frictional gearing, the combination with two truncated cones mounted on alined shafts with their working faces concaved on arcs of an imaginary circle, an upright rock shaft standing at the center of said circle, and a stub shaft projecting from it toward the cones; of a sleeve slidably mounted on said stub shaft, a disk journaled on said sleeve, a looped spring connected with the sleeve and embracing said rock shaft, and an adjustable lever carried by the rock shaft and to which said spring is connected.

10. In a frictional gearing, the combination with two truncated cones mounted on alined shafts with their working faces concaved on arcs of an imaginary circle, an upright rock shaft standing at the center of said circle, and a stub shaft projecting from it toward the cones; of a disk rotatable and slidable upon said stub shaft, a lever pivoted at one end to said rock shaft and connected between its ends with the hub of the disk for sliding the latter as the lever is moved, and a manual control for swinging the other end of the lever.

11. In a frictional gearing, the combination with two truncated cones mounted on alined shafts with their working faces concaved on arcs of an imaginary circle, an upright rock shaft standing at the center of said circle, and a stub shaft projecting from it toward the cones; of a sleeve slidable on said stub shaft, a disk rotatable on the sleeve and adapted to contact with both cones, a looped spring attached to the sleeve and embracing the rock shaft, a lever pivoted at one end to the latter and connected at its midlength to said spring and having a pin in its other end, a sliding element on said rock shaft having an oblique slot engaged by said pin, and a manual control for sliding said element.

12. In a frictional gearing, the combination with two truncated cones mounted on alined shafts with their working faces concaved on arcs of an imaginary circle, an upright rock shaft standing at the center of said circle, and a stub shaft projecting from it toward the cones; of a sleeve slidable on said stub shaft, a disk rotatable on the sleeve and adapted to contact with both cones, a looped spring attached to the sleeve and embracing the rock shaft, a lever pivoted at one end to the latter and connected at its midlength to said spring and having a pin in its other end, a collar slidably mounted on said rock shaft and having a lateral wing with an oblique slot engaging said pin, and a manual control for moving said collar.

13. In a frictional gearing, the combination with two cones mounted on alined axes and having their working faces concaved on the arc of an imaginary circle; of a rock shaft mounted at the center of said circle and having a stub shaft projecting therefrom toward the cones, a sleeve slidable on said stub shaft, a disk rotatable around the sleeve and contacting with both cones, one means for oscillating the rock shaft to set the disk at the desired angle, and another means for sliding the sleeve to move the disk into or out of contact with the cones at whatever its position.

14. In a frictional gearing, the combination with two cones mounted on alined axes and having their working faces concaved on the arc of an imaginary circle; of a rock shaft mounted at the center of said circle and having a stub shaft projecting therefrom toward the cones, a sleeve slidable on said stub shaft, a disk rotatable around the sleeve and contacting with both cones, mechanism connected with one of said cones for turning the rock shaft to set the disk at the desired angle, means for manually controlling the action of said mechanism and the direction and extent to which it moves said disk, and independent means for sliding the sleeve and moving the disk out of or into contact with the cones at will, irrespective of its setting.

15. In a frictional gearing, the combination with two cone-shaped drums mounted on alined axes and having their working faces concaved on arcs of an imaginary circle, of a disk constituting a slice or zone of an imaginary sphere generated by the revolution of said imaginary circle about its diameter, said disk being mounted to revolve about its own axis and to oscillate about the center of said circle but to remain in contact and revolve with both drums in its oscillations, said disk being located and proportioned so that when in direct drive position its face nearer the center of oscillation shall be between said center and the plane of the points of tangency of lines drawn from the intersections of axes of the disk and drums, but when in high or low gear positions the plane of the points of tangency of lines drawn from the intersections of the axes of the disk (in such positions) and drums shall be between the center of oscillation and the other face of the disk.

16. Variable speed, power transmitting mechanism comprising a pair of coaxial truncated cones set with their small ends adjacent on disconnected shafts and having their faces concaved on arcs of an imaginary circle, and a disk whose center is in the plane of the axis of the pair of cones and is movable toward and from the cones and is adapted to swing about the center of the arcs of the cones.

In testimony whereof I affix my signature.

FRED DORMANN.

Copies of this patent may be obtained for five cents each, by addressing the "Commissioner of Patents, Washington, D. C."